Oct. 6, 1970   M. B. LEISING ET AL   3,532,360
GAS GENERATING APPARATUS FOR VEHICLE SAFETY DEVICE
Filed July 22, 1968   3 Sheets-Sheet 3
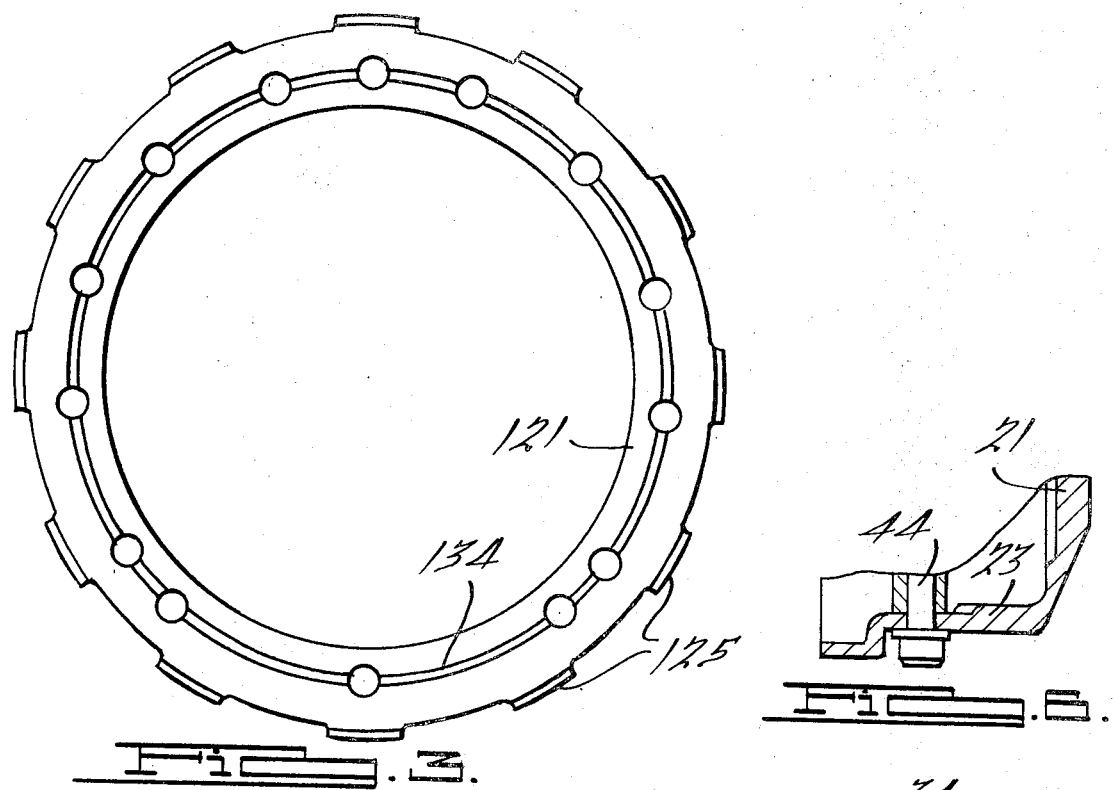
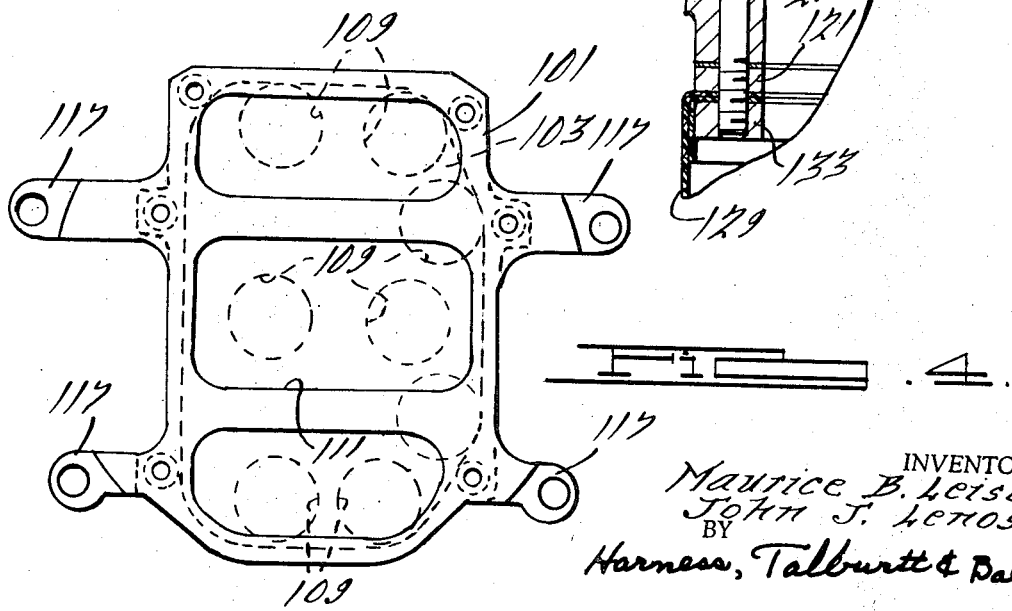
INVENTORS.
Maurice B. Leising
John J. Lenosky
BY
Harness, Talburtt & Baldwin,
ATTORNEYS.

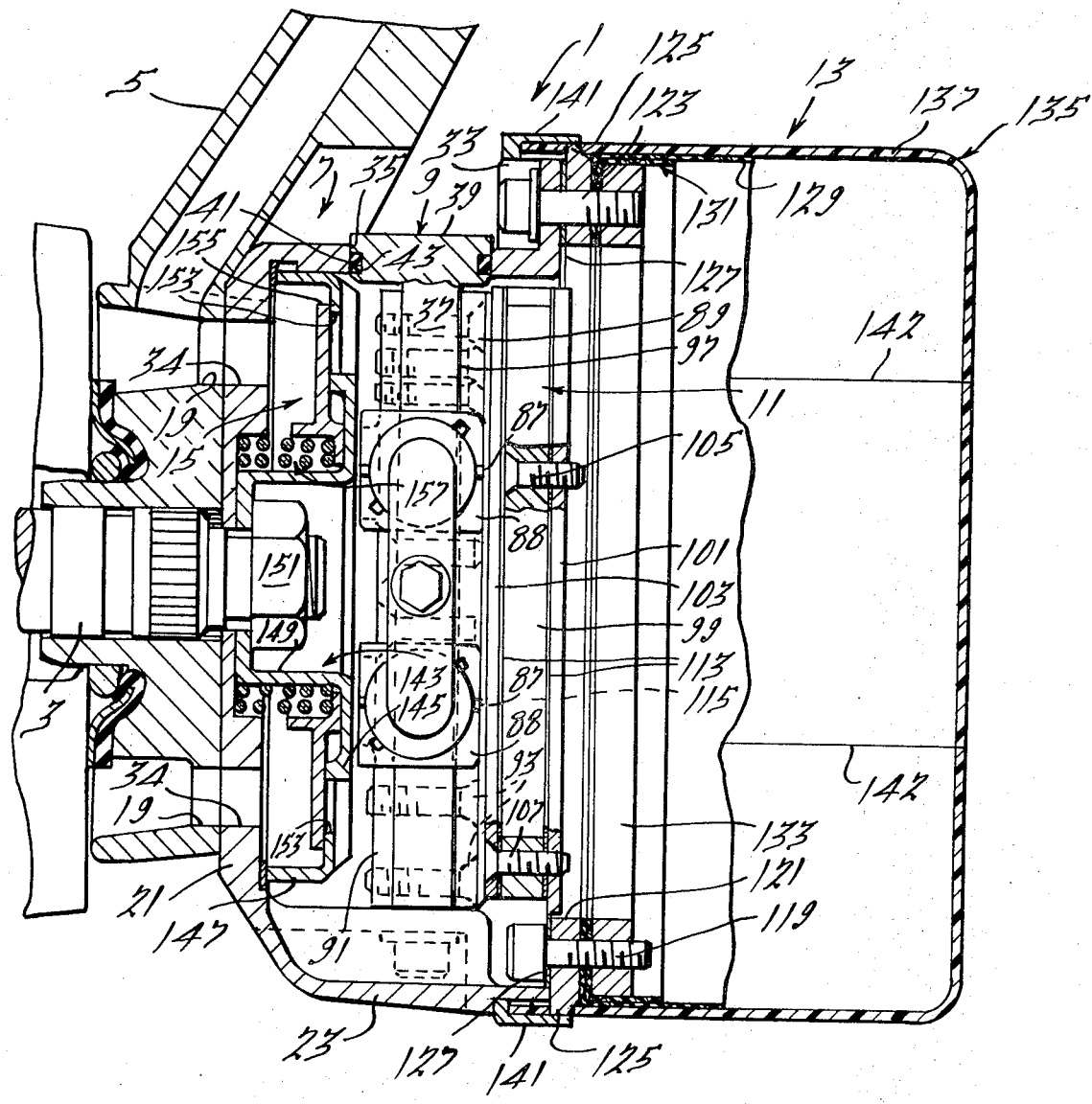

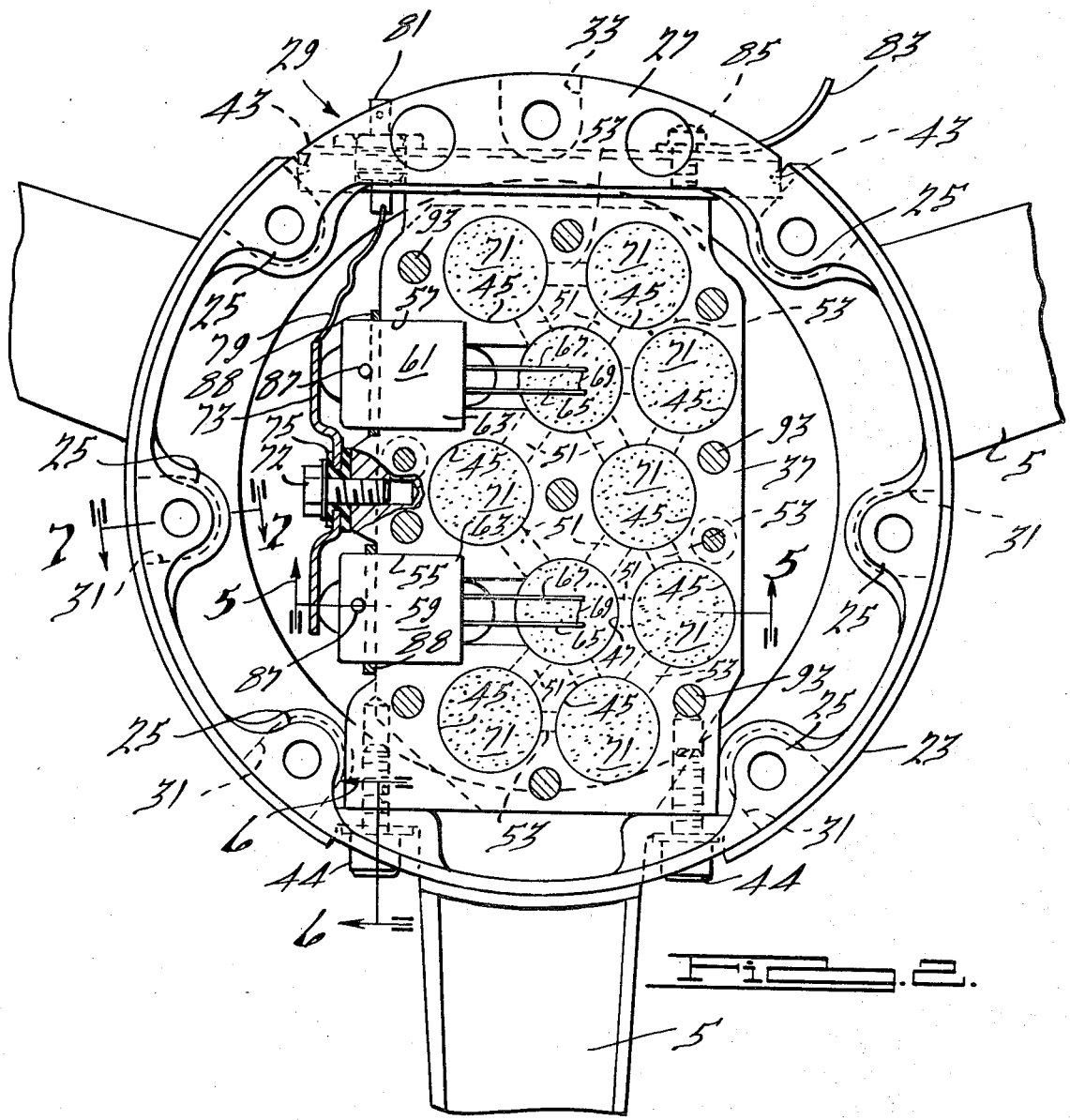
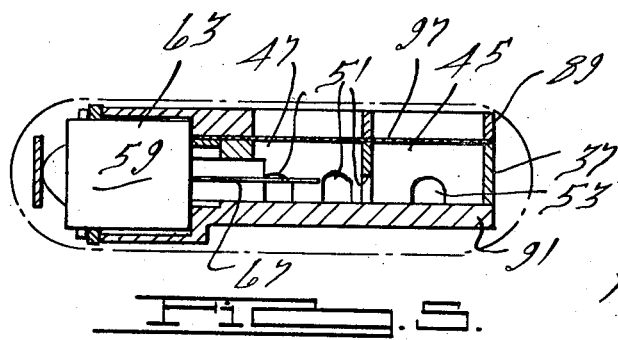

United States Patent Office 3,532,360
Patented Oct. 6, 1970

3,532,360
GAS GENERATING APPARATUS FOR VEHICLE SAFETY DEVICE
Maurice B. Leising, Clawson, and John J. Lenosky, East Detroit, Mich., assignors to Chrysler Corporation, Highland Park, Mich., a corporation of Delaware
Filed July 22, 1968, Ser. No. 746,574
Int. Cl. B60r 21/00
U.S. Cl. 280—150                                    21 Claims

ABSTRACT OF THE DISCLOSURE

Gas generating apparatus connectible to an automotive steering column, including a gas generating section holding propellant, electrical igniters for igniting the propellant, a coolant chamber containing coolant material for absorbing heat from ignited propellant, an inflatable bag connected to be in communication with the gas generating section and coolant chamber, and a pressure relief section which prevents the pressure in the bag from exceeding a predetermined pressure.

BACKGROUND OF THE INVENTION

This invention relates to gas generating apparatus and more particularly, to gas generating apparatus adapted to be connected to the steering column of an automotive vehicle.

Many types of gas source or generating devices particularly adapted for use in automotive vehicles are known. For example, some of these devices employ a sealed cylinder of compressed gas connected directly or by a conduit to an inflatable bag mounted on the interior of the vehicle. Another type of inflatable device employs an ignitable propellant to generate the gas. The latter type of device is disclosed in co-pending U.S. applications Ser. Nos. 746,333 and 746,560 both filed on July 22, 1968. The present device is of the type utilizing an ignitable propellant and is particularly adapted for connection to the steering column of the vehicle.

SUMMARY OF THE INVENTION

Briefly, this invention includes a housing, a gas generating section, a coolant chamber, and an inflatable bag all connected to the housing, and a pressure relief section for preventing the pressure in the bag from exceeding a predetermined pressure.

One of the primary objects of this invention is to provide gas generating apparatus adapted to be mounted on the upper end of an automotive vehicle steering column.

Another object of this invention is to provide apparatus such as described wherein an inflated bag thereof may be partially deflated upon impact of a passenger's torso to absorb energy thereof and prevent rebound.

Another object of this invention is to provide gas generating apparatus of the class described which provides for relief of gas when a predetermined pressure is attained in the apparatus.

A further object of this invention is to provide a device such as described in which excessive hot gas is discharged away from a passenger utilizing the device.

Another object of this invention is to provide an apparatus of the type described which is concealed and unobtrusive prior to operation.

Still another object of this invention is to provide a device of the class described in which the propellant may be easily installed.

A further object of this invention is to provide apparatus such as described which is economical in construction and reliable in operation.

Other objects and advantages of this invention will be made apparent as the description progresses.

BRIEF DESCRIPTION OF THE DRAWINGS

In the accompanying drawings in which one of various embodiment is illustrated,

FIG. 1 is a side elevation of apparatus constructed in accordance with this invention, certain parts being removed and shown in section for clarity;

FIG. 2 is a side elevation of FIG. 1, certain parts being shown in a rotated position and other parts being removed for clarity;

FIG. 3 is an elevation of one of the parts of the apparatus;

FIG. 4 is an elevation of another part of the apparatus; and

FIGS. 5, 6 and 7 are sections taken along lines 5—5, 6—6 and 7—7, respectively, of FIG. 2.

Like parts are indicated by corresponding reference characters throughout the several views of the drawings.

DESCRIPTION OF THE PREFERRED EMBODIMENTS

Referring now to the drawings, apparatus constructed in accordance with this invention is illustrated at 1 in FIG. 1. The apparatus 1 is connected to the upper end of a steering shaft 3 having a steering wheel 5 attached thereto. Basically, the apparatus includes a support or housing 7, gas generating section 9, a coolant chamber section 11, an inflatable bag section 13, and a pressure relief section 15.

Steering wheel 5 has a hub portion 17 mounted on the upper end portion of shaft 3. Hub 17 has a plurality of holes 19 therein the purpose of which will be made apparent hereinafter. Housing 7 is generally bowl shaped and includes a bottom wall portion 21 and a side wall 23, and circumferentially spaced internally extending enlarged portions 25 (FIGS. 2 and 7). A laterally extending flange 27 is provided along a portion 29 of the outer peripheral edge of wall 23. Recesses 31 and 33 are formed in the lower surfaces of portions 25 and 29, respectively. Openings 34 are provided in the bottom wall 21 and are axially aligned with holes 19.

Housing 7 has an opening 35 in the side wall 23 through which gas generator section 9 extends. Section 9 includes a main body 37 having a head 39 located within the opening 35. An O-ring 41 is located in a groove 43 in head 39 for sealing the perimeter of the latter to the side wall 23. Bolts 44 extend through housing wall 23 into body 37 for securing the latter to the wall. Body 37 has a plurality of cavities or pockets 45 therein. The confining means or pockets 45 are spaced from two primary ignition pockets 47 and 49, and as shown, are formed into two groups of three pockets connected respectively to pockets 47 and 49 by channels or grooves 51, and two pockets connected to both pockets 47 and 49 by grooves 51. In addition, the pockets are interconnected to one another by channels or grooves 53. However, the number of grooves and pockets may vary considerably without departing from the spirit of this invention.

Body 37 has recesses or bores 55 and 57 in which ignition devices 59 and 61 are located. The ignition devices may take various forms, such as fuses, ignition squibs, or electrical igniters, for example. As shown, the ignition devices are formed of photographic type flashbulbs 63 having two wire electrodes 65 and 67 joined at the outer ends thereof by a tungsten filament 69. The electrodes 65 and 67 and filament 69 extend into the pockets 47 and 49.

Each of the pockets 45, 47 and 49 and the channels 51 and 53 are provided with a supply of propellant material 71 adapted, when ignited, to burn rapidly.

Many sophisticated or exotic propellants such as rocket propellants are adapted to burn rapidly only when ignited under relatively highly pressurized conditions. Inasmuch as it is not desirable or practical to utilize highly pressurized chambers in devices of the type herein described, such exotic propellants have not proved practical or reliable. However, the well-known propellant, commonly referred to as black powder, will burn very rapidly under relatively low pressures. As is well known, black powder is composed of a mixture of the following materials in approximately the following amounts:

|  | Percent |
| --- | --- |
| Potassium nitrate | 75 |
| Charcoal | 15 |
| Sulfur | 10 |

Generally speaking, the smaller the granule size of the particles the faster the burning rate of the mixture.

A retainer and contact member 73 is connected to body 37 by an insulator 75 and bolt 77. Member 73 engages the electrical contacts of ignition members 59 and 61 and is connected by a wire 79 to a terminal 81 extending through an insulated opening in the head 39 of body 37. A wire 83, connected to ground, is attached to body 37 by a fastener 85. Body 37 is placed in electrical contact with the ignition device circuit by projections 87 extending away from the ignition device into contact with washers 88 which are in electrical contact with body 37.

A plate 89 and a lower plate 91 are secured to body 37 by a plurality of fasteners 93 extending through the plates and the body. Upper plate 89 has a plurality of holes 95 therein which are axially aligned with the pockets 45, 47 and 49 in the body. Sandwiched between upper plate 89 and body 37 is a diaphragm means 97 such as an aluminum foil diaphragm, for example. If desired, a second diaphragm, such as a polyethylene diaphragm, for example, could be placed adjacent diaphragm 97. The diaphragm prevents the inadvertent egress of propellant from the pockets in body 37. The diaphragm is adapted to rupture over a pocket when the pressure within such reaches a predetermined value, such as, for example, 150 p.s.i. This pressure value of 150 p.s.i. is only exemplary and the rupture pressure value could be higher or lower, if desired.

Coolant chamber section 11 includes a confining member or container body 99 formed in a closed loop and upper and lower plates 101 and 103, secured to body 99 by fasteners 105 and 107. Lower plate 103 has a plurality of holes 109 therein axially aligned with the holes in plate 89 of the gas generator section, while the upper plate 101 has a plurality of holes 111 therein, which are larger than holes 109. Sandwiched between plates 101 and body 99 and between plate 103 and body 99 are diaphragms 113, such as polyethylene diaphragms, for example.

Body 99 holds a supply of sublimable, vaporizable or decomposable material 115 capable of absorbing heat. Because the time in which the heat must be absorbed in very short, as explained hereinafter, many materials would not seem satisfactory. For example, ammonium carbonate and ammonium bicarbonate have, at moderate temperatures, relatively slow vaporization rates. It has been found that ammonium carbonate, for example, at a temperature of 400° F., sublimes or decomposes at a rate of approximately 2.5% (weight loss) per minute. However, it has been found that when subjected to the temperature and pressure of the gases released upon burning black powder in the environment disclosed herein, decomposition and heat absorption of ammonium carbonate increases to such an extent that the outside temperature of the bag is prevented from attaining a temperature which would produce minor burning of an occupant.

Ears 117 are provided on upper plate 101 and have holes therein through which fasteners 119 extend for securing the coolant chamber section 11 to a retaining ring 121 in turn secured to housing 7 by fasteners 123 and 124. Retaining ring 121, which forms part of bag section 13, has a plurality of downwardly tapered projections 125 spaced around the circumference thereof for a purpose to be made apparent hereinafter. A gasket or seal 127 is clamped between housing 7 and ring 121.

Bag section 13 also includes a bag 129. The edge of the bag 129 is of double thickness as indicated at 131 and secured to the ring 129 by a second ring 133 clamped on the folded edges by fasteners 119 and 123. Rings 133 and 121 have a tongue and groove relationship as indicated at 134. The bag is preferably formed of a flexible woven sheet material combined with rubber material and although not shown, is preferably folded with a plurality of generally axially extending folds to facilitate deployment of the bag without abrasive and damaging rubbing action. A generally cup-shaped bag cover 135, preferably formed of relatively thin plastic material, extends over the bag. The side wall 137 of the cover has a plurality of slots 139 through which the projections 125 extend to hold the cover in a predetermined position. A cover retaining ring 141 extends around the lower edges of the cover side wall 137. The cover 135 may be provided with a plurality of slits or score lines 142 which form lines of weakness to facilitate automatic removal of the cover upon inflation of the bag, as explained hereinafter.

Pressure relief section 15 includes a housing member 143 formed with a plate portion 145, an annular flange portion 147 and a cup-shaped central portion 149. Portion 149 has an opening therein through which shaft 3 extends. A nut 151 clamps the housing member 143 against the bottom wall 21 of housing 7. Plate portion 145 has a plurality of openings 153 therein against which a valve plate 155 is biased toward seating engagement by a spring means 157. As shown, spring means 157 comprises two springs, but it will be understood that only one spring or more than two springs could be used if desired. The spring means 157 is adapted to keep the valve plate 155 seated over openings 153 unless the pressure on the upper side of the valve plate (the right side as viewed in FIG. 1) exceeds a predetermined value, such as 20 p.s.i., for example.

Assuming the apparatus is in the position shown in FIG. 1, operation of the device of this invention is as follows:

Electrical current is supplied to each of the ignition devices 59 and 61 through the terminal 81, wire 79 and retainer contact 73 from a source (not shown) such as the automotive vehicle battery, for example. The current would be supplied in response to a signalling device adapted, for example, to sense an abrupt change in velocity of the vehicle, such as upon impact with another object.

When the current passes through the filaments 69, the propellant in each of the primary ignition pockets 47 and 49 ignites and begins burning. As used herein, the terms burn or burning mean a reaction which produces or creates gas. A pressure of 150 p.s.i., for example, is rapidly attained, i.e., within a few milliseconds in the pockets 47 and 49, and this pressure ruptures the diaphragm 97 over the area of the primary ignition pockets. The propellant in the primary ignition pockets which has not burned by the time the diaphragm 97 ruptures, is propelled or thrown, due to the 150 p.s.i. gas in the pockets, first through holes 109 in plate 103 and then through the diaphragm 113 which ruptures due to the pressure thereunder into the chamber formed by member 99 where it mixes with the material 115. The mixture then bursts through upper diaphragm 113 and openings 111 into the bag and continues to burn. The material 115 absorbs a significant portion of the heat produced by the burning propellant, both in the coolant chamber and the bag 129. Moreover, when the material 115 vaporizes, it releases additional gas for inflating the bag. This initial delivery of gases and burning powder into the bag causes the latter to begin to expand and force the cover to separate into petal shaped portions along lines 142 which fold back away from the bag, but are retained at one end by retainer 141 and projections 125.

This initial delivery of gas to the bag causes the latter to assume a partially deployed or partially inflated position. Thus, the bag is thrown into this partially expanded position by considerably less than the full force which would be exerted thereon if all of the powder-filled pockets were ignited simultaneously. If the latter condition occurred, two or more of the folds of the bag might be forced together and rub against one another with such force that the bag might rupture.

While the bag is being thrown into the partially expanded position, the powder in the channels 51 from each of the primary ignition pockets burns and ignites the powder in pockets 45 surrounding each of the primary pockets. The diaphragm portions covering such remaining pockets are quickly burst and the powder in such other pockets is also thrown through the chamber formed by member 99 into the bag as the expanding gases expand the bag. The powder thrown into the bag continues to burn to create gas for continuing the inflation of the bag until the latter reaches a desired pressure condition. At the same time the material 115 which is mixed with the burning propellant vaporizes and absorbs heat therefrom. As described previously, the absorption of heat causes the material 115 to release gas for inflating the bag and achieving the desired pressure. The ability of the material to do this may permit a reduction in the amount of propellant necessary to achieve the desired pressure in the bag.

If one of the ignition devices 59 or 61 should fail to ignite the propellant in the associated pocket 47 or 49, the pockets in the group of pockets surrounding the primary ignition pocket will still be ignited by the propellant in the channels 51 and 53 interconnecting the groups of pockets around the primary ignition pockets.

The total time period between passing current to the ignition devices and complete inflation of the bag is very short, such as 20-30 milliseconds, for example.

During the initial inflation period the pressure in the apparatus above the pressure relief section 15 may momentarily exceed the spring pressure applied to valve plate 155 by spring means 157 and cause the valve plate to be forced off the plate section 145, thereby opening holes 153 and permitting gas to escape through such holes and holes 34 and 19. Since these pressure conditions are only of very short duration, very little gas will be lost by the opening of holes 34.

When the vehicle undergoes rapid deceleration, such as during a frontal impact, for example, the driver moves rapidly forward toward the steering wheel. With the present construction the bag is substantially fully inflated to a substantially desired pressure prior to substantial forward movement of the driver. Accordingly, as the driver moves forward he contacts the inflated bag which cushions the driver's deceleration. However, if a pressure relief section, such as described herein were not employed, after the driver's forward movement is stopped, a substantial portion of the energy absorbed by the apparatus disclosed herein would be in the form of stored energy in the bag, and such stored energy is released in a rearwardly directed force against the driver, thereby causing the latter rebound backward. This rebound is not desirable and the pressure relief section 15 inhibits the occurrence thereof.

As the driver's torso is thrust against the bag, the pressure in the latter increases. When some predetermined pressure, such as 20 p.s.i., for example, is reached in the bag, which is in communication with pressure relief section 15, around the coolant chamber section and gas generator section, the pressure applied to valve plate 155 through openings 153 overcomes the spring force applied to the valve plate by spring means 157 and causes hot gas in the bag to be expelled therefrom through openings 153, 34 and 19. As noted hereinafter the gases expelled may be on the order of 2700° F., for example. Accordingly, it is desirable that the gases expelled be directed away from the driver. While, as shown, the openings 34 and 19 cause the gases to be directed down the steering column which may act as a cooling chamber, it will be understood that the gases could be directed away from the driver outside of the steering column.

As set forth in above mentioned patent application Ser. No. 746,560, it has been found that black powder may, when used in the manner described without a material 115, create a temperature in the bag of approximately 2700° F. and may cause the exterior of the bag to attain an outside surface temperature of as much as 300° F. By using a sublimable, vaporizable or decomposable material 115 it has been found that the outside temperature of the bag can be reduced to approximately 120° F. without adversely affecting the inflation of the bag.

It will be seen that the apparatus of this invention is readily adaptable for connection to the upper end of an automotive vehicle steering column. Moreover, the apparatus provides means for directing hot gases, produced by burning propellant held in the apparatus and utilized for inflating the bag, away from the driver upon impact of the driver against the inflated bag. Furthermore, the structure provides a cover for the bag adapted to rupture and be forced out of the way of the expanding bag.

In view of the foregoing, it will be seen that the several advantages and other features of this invention are attained.

Although only one embodiment of the invention has been disclosed and described, it is apparent that other embodiments and modifications of the invention are possible with the scope of the appended claims.

We claim:

1. Gas generating apparatus comprising a support, a gas generator section, an inflatable bag connected to said support, means in said gas generator section for causing inflation of said bag, a valve section in communication with the interior of said bag for permitting the escape of gas from said bag when the pressure in said bag rises above a predetermined pressure, and means connecting said valve section to said support, said gas generating section including a body having a plurality of cavities therein, said means for causing inflation of said bag comprising a supply of propellant in each of said cavities, and means for igniting said propellant in said cavities, said propellant, upon ignition, releasing gas to inflate said bag.

2. Gas generating apparatus comprising a support, a gas generator section, an inflatable bag connected to said support, means in said gas generator section for causing inflation of said bag, a valve section in communication with the interior of said bag for permitting the escape of gas from said bag when the pressure in said bag rises above a predetermined pressure, means connecting said valve section to said support, means in said gas generator section for causing inflation of said bag comprising a plurality of supplies of ignitable propellant, said plurality of supplies of propellant being adapted to produce heat, said apparatus further including a supply of coolant means located adjacent said supplies of propellant for mixing with said propellant, absorbing heat and for preventing the transfer of some of said heat to the wall portion of said bag.

3. Gas generating apparatus comprising a support, a gas generating section, an inflatable bag, means connecting said bag to said support, said gas generating section being communicable with the interior of said bag, means in said gas generating section for causing inflation of said bag, a valve section attached to said gas generating section, said means connecting said bag to said support being adapted to permit the passage of gas from the interior of said bag to said valve section, said valve section including means for permitting gas from said bag to pass therethrough when the pressure in said bag rises above a predetermined pressure, cover means normally extending over said bag, means normally securing said cover means to said apparatus, said cover means having means therein adapted to cause the latter to move from its normal position in a substantially predetermined manner upon inflation of said bag.

4. Gas generating apparatus as set forth in claim 3 wherein said gas generating section includes a body having at least one cavity therein, said means for causing inflation of said bag comprising a supply of propellant in said cavity, and means for igniting said propellant, said propellant, upon ignition, releasing gas to inflate said bag.

5. Gas generating apparatus as set forth in claim 3 wherein said support is generally cup-shaped and has at least one opening in the walls thereof, said valve section including movable means adapted to be moved between a first position wherein communication between the interior of said bag and said opening in said support is blocked and a second position wherein communication between the interior of said bag and said opening in said support is established, and means for biasing said movable means toward said first position.

6. Gas generating apparatus as set forth in claim 3 wherein said support is generally cup-shaped and has at least one opening in the walls thereof, said valve section including movable means adapted to be moved between a first position wherein communication between the interior of said bag and said opening in said support is blocked and a second position wherein communication between the interior of said bag and said opening in said support is established, and means for biasing said movable means toward said first position.

7. Gas generating apparatus comprising a support, a gas generator section, an inflatable bag connected to said support, means in said gas generator section for causing inflation of said bag, a valve section in communication with the interior of said bag for permitting the escape of gas from said bag when the pressure in said bag rises above a predetermined pressure, means connecting said valve section to said support, a cover member extending over said bag, and means securing said cover member to said apparatus, said cover member having lines of weakness therein to permit said cover member to separate into sections generally along said lines of weakness upon inflation of said bag.

8. Gas generating apparatus comprising a support, a gas generator section, an inflatable bag connected to said support, means in said gas generator section for causing inflation of said bag, a valve section in communication with the interior of said bag for permitting the escape of gas from said bag when the pressure in said bag rises above a predetermined pressure, means connecting said valve section to said support, said gas generator section including a body having at least one cavity therein, said means for causing inflation of said bag comprising a supply of propellant in said cavity, means for igniting said propellant, said propellant, upon ignition, releasing gas to inflate said bag, and a coolant chamber section located adjacent said gas generating section, said chamber holding a supply of material adapted to absorb heat.

9. Gas generating apparatus comprising a support, a gas generating section, an inflatable bag, means connecting said bag to said support, said gas generating section being communicable with the interior of said bag, means in said gas generating section for causing inflation of said bag, a valve section, said means connecting said bag to said support being adapted to permit the passage of gas from the interior of said bag to said valve section, said valve section including means for permitting gas from said bag to pass therethrough when the pressure in said bag rises above a predetermined pressure, a cover member extending over said bag, and means securing said cover member to said apparatus, said cover member having lines of weakness therein to permit said cover member to separate into sections generally along said lines of weakness upon inflation of said bag.

10. Gas generating apparatus as set forth in claim 9 wherein said means securing said cover to said apparatus includes a ring member having a plurality of outwardly extending projections extending through slots in said cover member, and a retaining member surrounding the edge portions of said cover member and said projections.

11. Gas generating apparatus comprising a support, a gas generating section, an inflatable bag, means connecting said bag to said support, said gas generating section being communicable with the interior of said bag, means in said gas generating section for causing inflation of said bag, a valve section, said means connecting said bag to said support being adapted to permit the passage of gas from the interior of said bag to said valve section, said valve section including means for permitting gas from said bag to pass therethrough when the pressure in said bag rises above a predetermined pressure, and a coolant chamber section located adjacent said gas generating section, said chamber, holding a supply of material adapted to prevent the transfer of some of the heat produced by the ignited propellant to said bag walls.

12. Gas generating apparatus comprising a support, a gas generating section, an inflatable bag, means connecting said bag to said support, said gas generating section being communicable with the interior of said bag, means in said gas generating section for causing inflation of said bag, a valve section, said means connecting said bag to said support being adapted to permit the passage of gas from the interior of said bag to said valve section, said valve section including means for permitting gas from said bag to pass therethrough when the pressure in said bag rises above a predetermined pressure, said gas generating section including a body having means for confining a plurality of portions of propellant therein, said body being closed on one side, plate means extending across the other side of said body and having openings therein, rupturable means sandwiched between said plate and said body, propellant in said confining means, means for igniting said propellant, said propellant, when ignited, releasing gas to rupture said rupturable means and inflate said bag.

13. Gas generating apparatus as set forth in claim 12 further comprising a coolant chamber section located adjacent said gas generating section, said chamber holding a supply of material adapted to prevent the transfer of some of the heat produced by the ignited propellant to the walls of said bag, rupturable means on opposite sides of said chamber, said gas released by said ignited propellant first rupturing the rupturable means on one side of said chamber, then passing through and mixing with said material adapted to absorb heat, and then rupturing the rupturable means on the other side of said chamber before inflating said bag, said material preventing some of heat from the gas released by said ignited propellant from being transferred to said bag walls.

14. Gas generating apparatus comprising a support, a gas generating section, an inflatable bag, means connecting said bag to said support, said gas generating section being communicable with the interior of said bag, means in said gas generating section for causing inflation of said bag, a valve section, said means connecting said bag to said support being adapted to permit the passage of gas from the interior of said bag to said valve section, said valve section including means for permitting gas from said bag to pass therethrough when the pressure in said bag rises above a predetermined pressure, said gas generating section including a body having at least one cavity therein, said means for causing inflation of said bag comprising a supply of propellant in said cavity, means for igniting said propellant, said propellant, upon ignition, releasing gas to inflate said bag, said support being generally cup-shaped and having at least one opening in the walls thereof, said valve section including movable means adapted to be moved between a first position wherein communication between the interior of said bag and said opening in said support is blocked and a second position wherein communication between the interior of said bag and said opening in said support is established, means for biasing said movable means toward said first position, a cover member extending over said bag and means securing said cover member to said apparatus, said cover member having lines of weakness therein to permit said cover member to separate into sections generally along said lines of weakness upon inflation of said bag.

15. Gas generating apparatus as set forth in claim 14 wheren said means securing said cover to said apparatus includes a ring member having a plurality of outwardly extending projections extending through slots in said cover member, and a retaining member surrounding the edge portions of said cover member and said projections.

16. Gas generating apparatus comprising a support, a gas generating section, an inflatable bag, means connecting said bag to said support, said gas generating section being communicable with the interior of said bag, means in said gas generating section for causing inflation of said bag, a valve section, said means connecting said bag to said support being adapted to permit the passage of gas from the interior of said bag to said valve section, said valve section including means for permitting gas from said bag to pass therethrough when the pressure in said bag rises above a predetermined pressure, said gas generating section including a body having at least one cavity therein, said means for causing inflation of said bag comprising a supply of propellant in said cavity, means for igniting said propellant, said propellant, upon ignition, releasing gas to inflate said bag, and a coolant chamber section connected to said support adjacent said gas generating section, said chamber holding a supply of material adapted to absorb heat.

17. Gas generating apparatus as set forth in claim 16 wherein said support is generally cup-shaped and has at least one opening in the walls, thereof, said means in said valve section including movable means adapted to be moved between a first position wherein communication between the interior of said bag and said opening in said support is blocked and a second position wherein communication between the interior of said bag and said opening in said support is open, and means for biasing said movable means toward said first position.

18. Gas generating apparatus as set forth in claim 17 further comprising a cover member extending over said bag, and means securing said cover member to said apparatus, said cover member having lines of weakness therein to permit said cover member to separate into sections generally along said lines of weakness upon inflation of said bag.

19. Gas generating apparatus comprising a housing, a gas generating section mounted within said housing, an inflatable bag, means connecting said bag to said housing adjacent said gas generating section and adapted to place said gas generating section in communication with the interior of said bag, means in said gas generating section for causing inflation of said bag, a valve section adjacent said gas generating section, said means connecting said bag to said housing being adapted to permit the passage of gas from the interior of said bag to said valve section, said valve section including means for permitting gas from said bag to pass therethrough when the pressure in said bag rises above a predetermined pressure, said housing having passages therethrough for permitting the discharge of gas therefrom, said gas generating section including a body having at least one cavity therein, said means for causing inflation of said bag comprising a supply of propellant in said cavity, means for igniting said propellant, said propellant, upon ignition, releasing gas to inflate said bag, a cover member extending over said bag, and means securing said cover member to said apparatus, said cover member having lines of weakness therein to permit said cover member to separate into sections along said lines of weakness upon inflation of said bag.

20. Gas generating apparatus as set forth in claim 19 further comprising a coolant chamber section connected to said housing adjacent said gas generating section, said chamber holding a supply of material adapted to absorb heat.

21. Gas generating apparatus as set forth in claim 20 wherein said means securing said cover to said apparatus includes a ring member having a plurality of outwardly extending projections extending through slots in said cover member, and a retaining member surrounding the edge portions of said cover member and said projections.

References Cited

UNITED STATES PATENTS

| | | | |
|---|---|---|---|
| 2,850,291 | 9/1958 | Ziccardi | 280—150 |
| 2,993,217 | 7/1961 | Switlik | 9—316 |
| 2,995,088 | 8/1961 | Asplund | 102—39 |
| 3,066,014 | 11/1962 | White et al. | 23—281 |
| 3,089,419 | 5/1963 | Pollard | 102—39 |
| 3,163,014 | 12/1964 | Wismar | 23—281 X |
| 3,403,625 | 10/1968 | Jacobson et al. | 102—38 |
| 3,425,712 | 2/1969 | Berryman | 280—150 |
| 3,450,414 | 6/1969 | Kobori | 280—150 |
| 3,451,693 | 6/1969 | Carey | 280—150 |

KENNETH H. BETTS, Primary Examiner

U.S. Cl. X.R.

23—281